Dec. 14, 1971  F. F. TONE ET AL  3,626,618
INFORMATION BEARING CARD
Filed Nov. 12, 1969  5 Sheets-Sheet 1
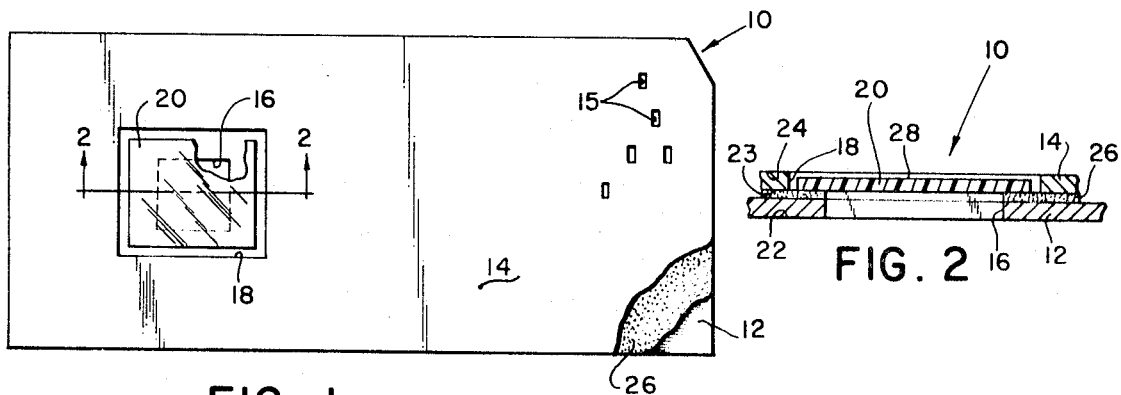
FIG. 1  FIG. 2
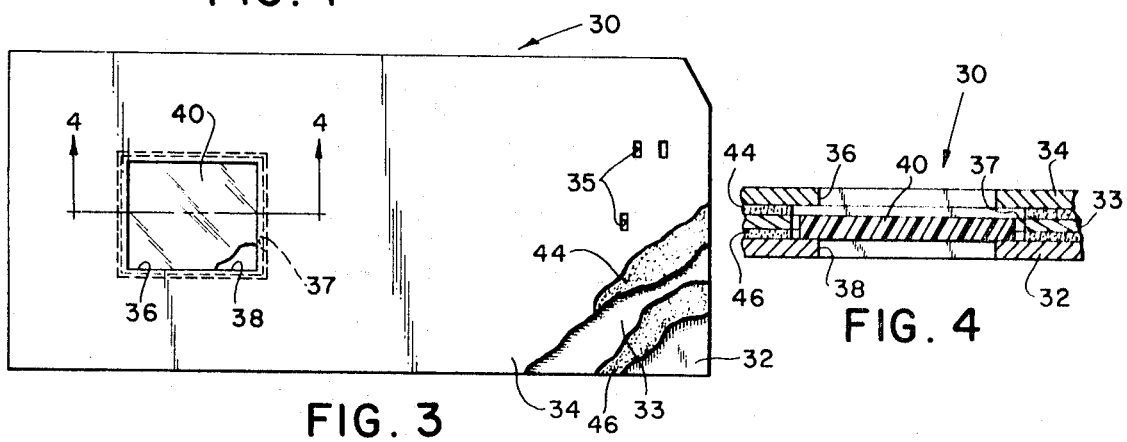
FIG. 3  FIG. 4
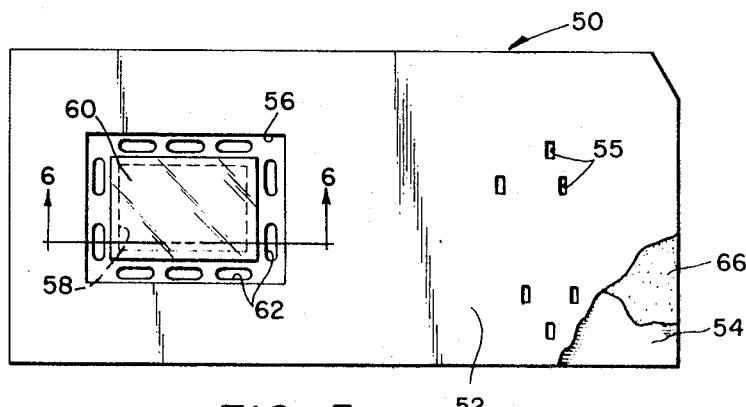
FIG. 5
FIG. 6
FREDERICK F. TONE
H. GLYNN WARREN
  INVENTORS
BY
ATTORNEYS Dec. 14, 1971  F. F. TONE ET AL  3,626,618
INFORMATION BEARING CARD Filed Nov. 12, 1969  5 Sheets-Sheet 3

FREDERICK F. TONE
H. GLYNN WARREN
INVENTORS

BY

ATTORNEYS

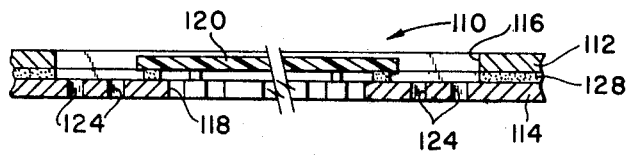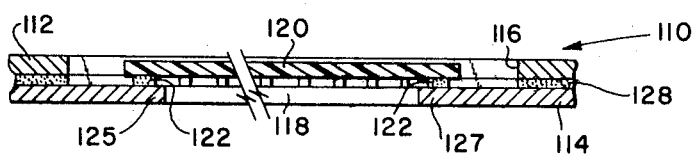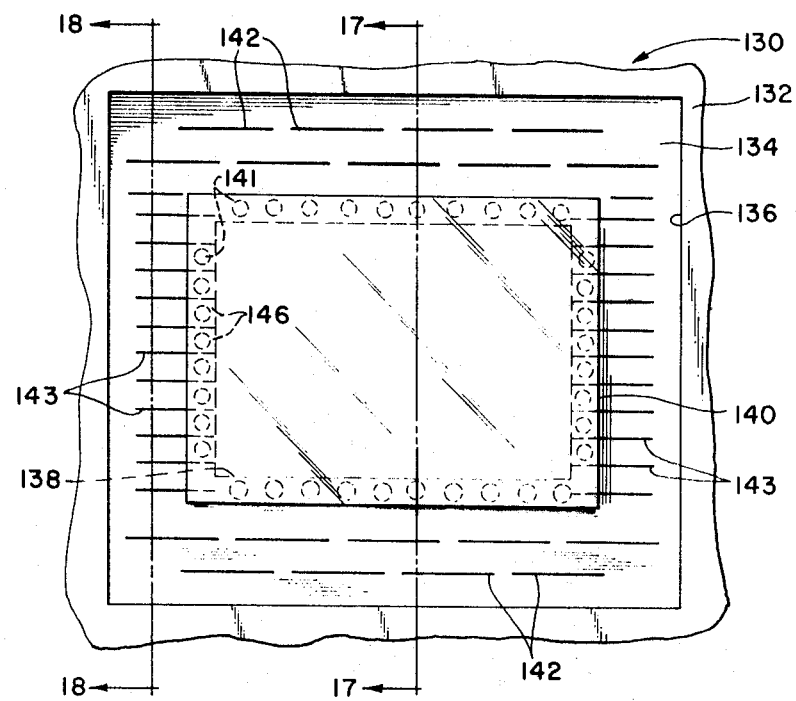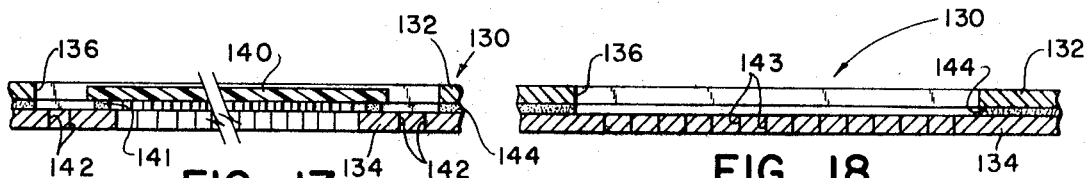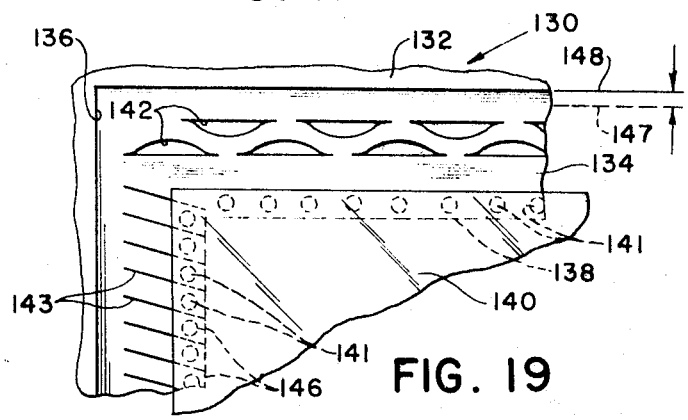

United States Patent Office 3,626,618
Patented Dec. 14, 1971

3,626,618
INFORMATION BEARING CARD
Frederick F. Tone, Holly, and Horace G. Warren, Hilton, N.Y., assignors to Eastman Kodak Company, Rochester, N.Y.
Filed Nov. 12, 1969, Ser. No. 875,892
Int. Cl. G09f 1/10
U.S. Cl. 40—158 B                              8 Claims

ABSTRACT OF THE DISCLOSURE

An information bearing card is provided for receiving an information bearing media such as a chip of photosensitive film and capable of being coded so as to be easily retrieved from a plurality of similar cards. More specifically, the information bearing card is made up of at least first and second laminar layers, which are secured together with a suitable adhesive. The first and second laminar layers respectively have a larger and a smaller aperture therein. The information bearing medium or chip has dimensions intermediate between the smaller and larger apertures and is disposed within the larger aperture of the first laminar layer. Further, the first laminar layer may have a series of slits or apertures disposed about the information bearing medium to relieve stresses that may be placed on the mounted information bearing medium.

BACKGROUND OF THE INVENTION

Field of the invention

This invention relates to information bearing cards adapted for card classification and tabulating systems, and more particularly to laminar information bearing cards for receiving information bearing media such as film chips in apertures in such cards.

Description of the prior art

Chips of microfilms and other information bearing media have been mounted in apertures in record and information bearing cards by simple methods such as adhesives or tapes. Such cards are provided with coding such as perforations disposed therethrough which can be read by suitable sensing apparatus in order to sort and/or retrieve information from the cards.

Information or record cards have typically taken the form of a card made of a suitably stiff material such as paper and having a rectangular opening for receiving therein a rectangularly shaped chip of film. Illustratively, the chip has a rectangular configuration of dimensions smaller than the rectangular opening within the card. A rectangular shaped mounting sheet may be provided for securing the chip to the card; typically, the mounting sheet has a rectangular outer periphery larger than that of the rectangular opening within the card and a rectangular opening therethrough having dimensions smaller than those of the chip. The mounting sheet serves to mount the chip upon te card and is typically bonded by suitable adhesive to the card and to the chip. In such a construction, the adhesive surface of the mounting sheet lies upon the surface of the card and thus, the other surface of the mounting sheet protrudes beyond the surface of the card. It is apparent that the protruding mounting sheet may interfere with the proper handling of a stack of similar cards in that adjacent cards may not be able to slide easily with respect to each other.

In addition, the mounting sheet mounts the chip so that the emulsion thereof is spaced away from the other side of the aperture card. Typically, it may be desired to contact print information either from or upon the chip mounted in the aperture card. If the emulsion cannot be placed directly upon the other medium, it will be difficult to transfer information by contact printing between the chip and a second piece of photographic film. Similarly, if data is to be transferred by projection printing between the chip mounted in the aperture card and the second piece of photographic film, there will be a problem in focusing the image between the chip and the second piece of film because the film chip must be squeezed or disposed between transparent platens in order to insure that the chip is disposed in the focus plane. More particularly, the transparent platen approaching from the side of the aperture card carrying the mounting sheet must be smaller than the internal opening in the mounting sheet if it is to uniformly contact the chip.

Another problem may arise if a mounting sheet is used to bond the chip to the information bearing card. As changes occur in temperature or moisture content of the film chip and record card, the chip and record card will expand or contract at different rates resulting in a deformity of the card assembly commonly known as "potato chipping." The effect of a differential rate of expanding is particularly noted when an adhesive of the thermosetting variety is used to secure the mounting sheet to the chip and to the record card.

It is an object of this invention to enhance the handling characteristics of information cards.

It is a further object of this invention to mount information bearing media on information cards so that images may be transferred to or from the media as by projection or contact printing.

It is a further object of this invention to eliminate the problems due to the differential rates of expansion and contraction of the record cards and the information bearing media.

SUMMARY OF THE INVENTION

These and other objects are accomplished in accordance with the teachings of this invention by providing an information bearing card including at least first and second laminar layers and an information bearing medium to be mounted upon the card. More specifically, the first and second laminar layers respectively have a larger and a smaller opening therein. The dimensions of the information bearing medium are selected to be smaller than the corresponding dimensions of the larger opening and larger than the corresponding dimensions of the smaller opening. The information bearing medium is disposed within the smaller opening upon the first laminar layer.

In one illustrative embodiment of this invention, openings may be disposed about the information bearing medium in the first laminar layer so that as the first laminar layer and the information bearing medium contract and expand at differing rates, the resultant forces may be relieved without deforming the card assembly. The opening may illustratively take the form of slits along the direction of the "wire" direction or grain of the material of which the laminar material is made.

The invention and its objects and advantages will become more apparent in the detailed description of the preferred embodiments presented below.

BRIEF DESCRIPTION OF THE DRAWINGS

In the detailed description of the preferred embodiments of the invention presented below, reference is made to the accompanying drawing, in which:

FIG. 1 is a plan view of an information bearing card in accordance with the teachings of this invention;

FIG. 2 is a partial, sectioned view of the information bearing card taken along line 2—2 of FIG. 1;

FIG. 3 is a plan view of a three laminar layer, information bearing card in accordance with the teachings of this invention;

FIG. 4 is a partial, cross-sectioned view of the laminar card taken along line 4—4;

FIG. 5 is a plan view of an information-bearing card having openings disposed about the information bearing medium mounted thereon in accordance with the teachings of this invention;

FIG. 6 is a partial, cross-sectioned view of the laminar card shown in FIG. 5 taken along line 6—6;

FIGS. 14 and 15 are respectively partial cross-sectioned views of the information bearing card of FIG. 13 taken respectively along lines 14 and 15;

FIG. 16 is a partial, enlarged view of an information bearing card in accordance with the teachings of this invention in which slits are disposed about the information bearing medium along the wire direction of the material of which the card is made;

FIGS. 17 and 18 are partial, enlarged, sectioned views of the information bearing card shown in FIG. 16, taken along lines 17 and 18, respectively;

FIG. 19 is a partial, enlarged view of the information bearing card shown in FIGS. 16, 17 and 18 in which the effects of differing rates of expansion of the card and the medium are demonstrated;

DESCRIPTION OF THE PREFERRED EMBODIMENTS

Figure 7:
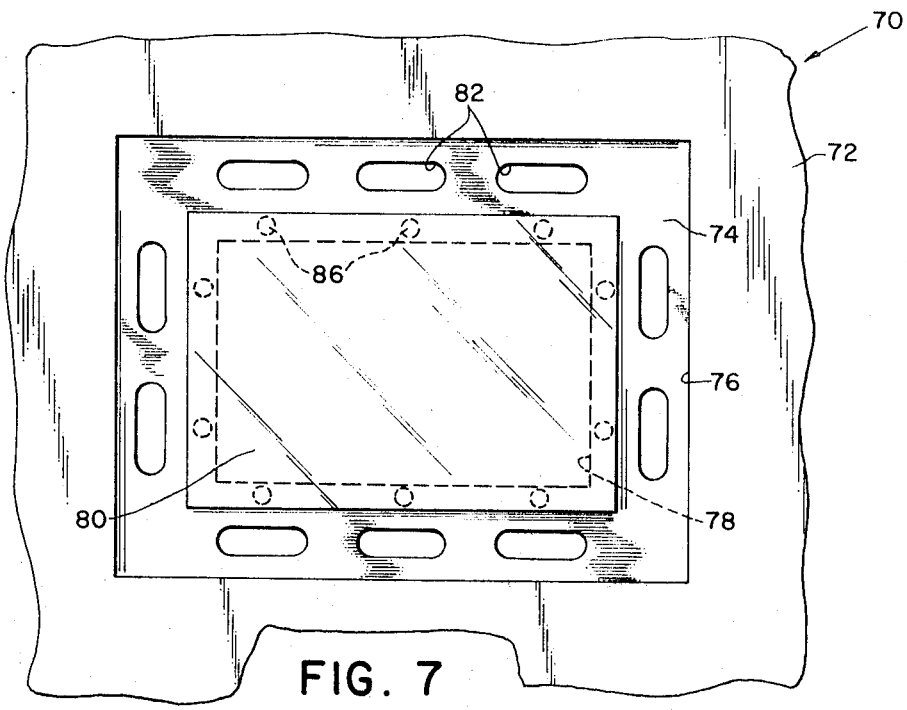
FIG. 7 is an enlarged, plan view showing the information bearing medium and the openings of the information bearing card shown in FIGS. 5 and 6.

With reference to the drawings, and in particular FIGS. 1 and 2, there is shown an aperture or information bearing card 10 made up of first and second laminar layers 12 and 14 bonded together by a suitable adhesive 26. The first and second laminar layers 12 and 14 respectively have first and second apertures 16 and 18 disposed therein by a suitable method such as punching. As shown in FIG. 1, the apertures 16 and 18 are of substantially rectangular configurations and are dimensioned so that the corresponding dimensions of aperture 18 are larger than those of aperture 16. As indicated in FIG. 2, the adhesive 26 could be applied to an entire surface 23 of the first laminar layer 12 to thereby provide an area of adhesive adjacent to the aperture 16 which would be suitable for adhesion to an information bearing medium 20. The medium 20, as shown in FIGS. 1 and 2, may take the form of a chip of photographic film. Further, the medium 20 has a substantially rectangular configuration whose dimensions are smaller than the corresponding dimensions of aperture 18 and are larger than the corresponding dimensions of aperture 16. As seen in FIG. 2, the medium 20 is disposed within the aperture 18 and is bonded to the first laminar layer 12 by the adhesive 26. Openings 15 may be disposed through the card 10 to facilitate the sorting and/or retrieval of a selected card from a stack of similar cards.

It is apparent from FIG. 2 that no portion of the card structure protrudes beyond surfaces 22 and 24 of the information bearing card 10. In general, a card such as the information bearing card 10 including two laminar layers bonded together by adhesive would be stiffer and more resistant to bending or to flexing forces than a similar card made of a single layer of the same paper or card material. By suitably selecting the relative thickness of the laminar layers 12 and 14 as compared with the thickness of the medium 20, a surface 28 of the medium 20, i.e. the emulsion surface, may be placed so as to substantially coincide approximately with the surface 24 of the information bearing card 10. As a result, the card 10 will be easy to handle since there will be no protruding element interfering with the sliding of adjacent cards. In addition, the emulsion surface 28 of the medium 20 may be more accurately located to thereby minimize contact printing or projection printing problems.

It is noted that by the choice of a suitable adhesive application technique such as printing on adhesives, it would be possible to use one adhesive to hold the first and second laminar layers 12 and 14 together and a different adhesive within the area of aperture 18 to bond the medium 20 to the laminar layer 12. Thus, the more suitable adhesives can be chosen to hold the laminar layers 12 and 14 together and to hold the medium 20 to the laminar layer 12. For example, it would be possible to use a heat sealable adhesive for laminating the laminar layers 12 and 14 together and to use a pressure sensitive adhesive to adhere the medium 20 to the laminar layer 12.

In one illustrative embodiment of the information bearing card 10, the first and second laminar layers 12 and 14 may be made of equal thickness, e.g. 0.0032 inch thick, and the adhesive 26 could be applied in such a fashion that in the final laminar it will occupy or contribute a thickness of 0.0005 inch to the assembly, giving an overall thickness for the information bearing card 10 of approximately 0.007 inch. If the depth of the aperture 18 is approximately 0.032 inch it would be desirable to use a medium 20 having a thickness slightly less than this dimension; for example, a medium 20 of approximately 0.0025 inch thick could be used to thereby provide the desired recessing action of surface 28 slightly below the surface 24 of the laminar layer 14.

The information bearing card 10 as described above can be used as a camera card, a copy card, or an image card, in all of which cards the medium, exposed or unexposed, is mounted when it is produced. In addition, it would be within the contemplation of this invention to provide the card 10 without mounting a medium 20 therein, and then subsequently place the medium 20 after it has been exposed and processed. The card 10 could employ a heat sealable adhesive 26 to mount the medium 20 by the use of a heating device at a later time. If it is desired to use a pressure sensitive adhesive 26 to hold the medium 20 to the card 10, it may be necessary to insert a thin protective sheet, the same size as the medium 20, at the time of card manufacture and to remove this sheet just before insertion of the exposed and processed medium 20, in order to protect the surface of the pressure sensitive adhesive 26 in the interim.

Referring now to FIGS. 3 and 4, there is shown a three layer laminar information bearing card 30 made up of first, second and third laminar layers 32, 33 and 34 secured together by layers 44 and 46 of adhesive. As indicated in FIG. 4, substantially rectangular apertures 36 and 38 are disposed in laminar layers 32 and 34 and have dimensions larger than those of a substantially rectangular aperture 37 disposed in the layer 33. An information bearing medium 40 is disposed, as shown in FIG. 4, within the aperture 37. The medium 40 is of a substantially rectangular configuration and has dimensions smaller than the corresponding dimensions of the aperture 37 and larger than the corresponding dimensions of apertures 36 and 38. As a result, the medium 40 is retained within the pocket formed by the layers 32 and 34 without the use of an adhesive. However, the layers 44 and 46 of adhesive could be disposed over the entire inner surfaces of the laminar layers 32 and 34 to thereby rigidly adhere the medium 40 to the layers 32 and 34. Perforations 35 may be disposed through the layers 32, 33 and 34 to thereby provide a suitable coding for the information bearing card 30.

Other variations on the construction shown in FIGS. 3 and 4 are possible; for example, the adhesive may be printed or disposed on laminar layer 32 in a narrow region adjacent to only one edge of the aperture 38 for adhering the medium 20 to the laminar layer 32 after the initial bonding of layer 32 to layer 30. Thus, means is provided for holding the medium 40 in place during the lamination of the layer 34 to the layer 33. In the final configuration, the medium 20 is restrained or fastened to the laminar layer 34 at only one of its four edges, which will tend to minimize warping or buckling due to differential expansions between the medium 20 and the laminar layers 34 due to temperature and/or humidity variations. In another embodiment, the adhesive layers 44 and 46 could be of one type whereas additional layers of the adhesive could be applied to the inner surfaces of the laminar layers 32 and 34 which overlie the medium 40. This different or second adhesive could be of the type which is heat sealable at a first relatively high temperature but which loses its bonding characteristics when it is disposed at a second, cooler temperature. Thus, an information bearing card 30 could be assembled at a first high temperature so that the medium 40 could be sealed into an initial assembly including laminar layers 33 and 34. When the assembly cools down, the sealing between the medium 40 and the laminar layer 34 is lost and the medium 40 is essentially free of restraint from the laminar layers 32 and 34. In a still further variation (not shown) of the information bearing card 30 shown in FIGS. 3 and 4, the apertures 36, 37 and 38 may be made of substantially the same dimension in a vertical sense as seen in FIG. 3. As a result, the medium 40 may be held by the information bearing card 30 along its short dimension, whereas no support is given to the long dimension of the medium 40. In another embodiment (not shown), the vertical dimension of apertures 36 and 37 could be made the same, while the vertical dimension of aperture 38 is made slightly smaller than that shown in FIG. 3. In such constructions, the medium 40 may be easily inserted at a later time by flexing the medium 40 into a cylindrical configuration so that the edges along the short dimension may be disposed between the laminar layers 32 and 34 to thereby retain the medium 40 within the card 30.

With regard to FIGS. 5 and 6, there is shown another embodiment of this invention taking the form of an information bearing card 50. As seen in FIG. 6, the information bearing card 50 includes first and second laminar layers 52 and 54 bonded together by a suitable adhesive 66. The laminar layers 52 and 54 have respectively apertures 56 and 58 disposed therein. The aperture 56 is of a substantially rectangular configuration whose dimensions are larger than the corresponding dimensions of the substantially rectangular aperture 58. As shown in FIG. 6, an information bearing medium 60 is secured within the aperture 56 to the laminar layer 54 by the adhesive 66. As shown in FIG. 5, the peripheral space between the outer periphery of the medium 60 and the inner periphery of the aperture 56 is filled with a plurality of elongated openings or perforations 62. For example, two of such perforations 62 may be disposed on the short side of the aperture 56 and three perforations 62 may be disposed on the long side of the aperture 68. Thus, as temperature and/or humidity change and medium 60 and the laminar layer 54 expand at different rates, the forces of contraction or tension will be alleviated to a certain degree by the presence of the openings 62 which permit the laminar layer 54 to be squeezed together or to be elongated without buckling the information card 50.

Figure 8:
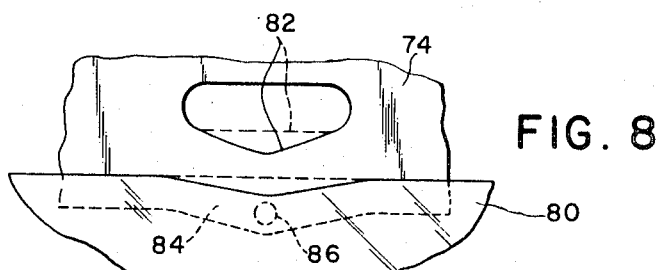
FIG. 8 is an enlarged view of the information bearing card shown in FIGS. 5–7 demonstrating the effects of providing openings about the information bearing medium.

With regard to FIGS. 7 and 8, there is shown an information bearing card 70 including first and second laminar layers 72 and 74 bonded together by a suitable adhesive. In a manner similar to that described above, laminar layer 74 has a first substantially rectangular aperture 76 whose dimensions are larger than a second substantially rectangular aperture 78. An information bearing medium 80 is disposed within the aperture 76, and is secured to the mounted layer 74 by a plurality of areas 86 of adhesive which are disposed about the periphery of the aperture 78 as shown in FIG. 7. Further, a plurality of perforations or elongated openings 82 are disposed in the area between the periphery of the information bearing medium 80 and the inner periphery of the aperture 76. Preferably, the areas 86 of sealing are disposed centrally of the elongated perforation 82 so that when the tension is developed between the medium 80 and the laminar layer 74, a portion of the laminar layer 74 is stretched as shown in FIG. 8 to thereby form a strut 84. The strut 84 may be deflected at the center of the perforation 82 by the relative forces which exist between the medium 80 and the laminar layer 74. Thus, the medium 80 may be said to be mounted upon the laminar layer 74 by means of a number of resilient, flexible struts 84 which tend to absorb or minimize the forces exerted upon the medium 80 by the layer 74. It is apparent that the technique of securing the medium 70 to the laminar layer 74 could be adapted to a three laminar card structure as shown in FIGS. 3 and 4 by providing elongated perforations about the periphery of the medium in the two outer laminar layers.

Figure 9:
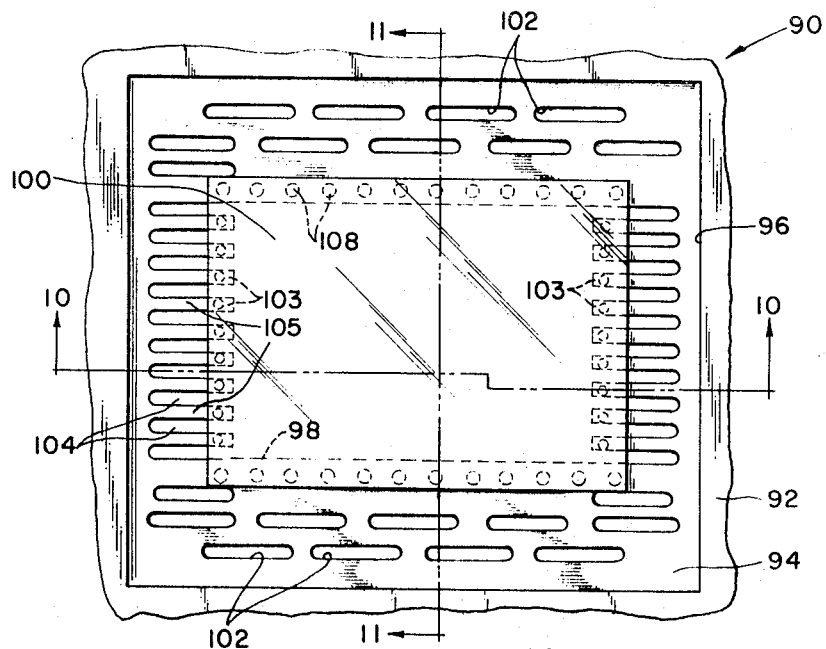
FIG. 9 is a partial, plan view of an alternative embodiment of this invention in which openings are disposed along the wire direction of the material of which the card is made.
Figure 10:
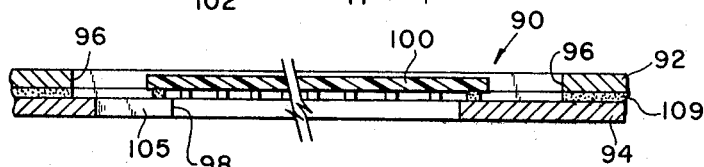
FIGS. 10 and 11 are enlarged, sectioned views of the information bearing card shown in FIG. 9 taken respectively along lines 10 and 11.
Figure 11:
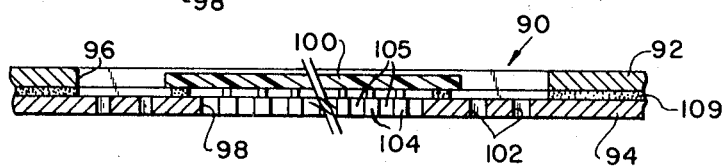

With reference to FIGS. 9, 10 and 11, there is shown an information bearing card 90 made up of first and second laminar layers 92 and 94 secured together by a suitable adhesive 109.

Figure 12:
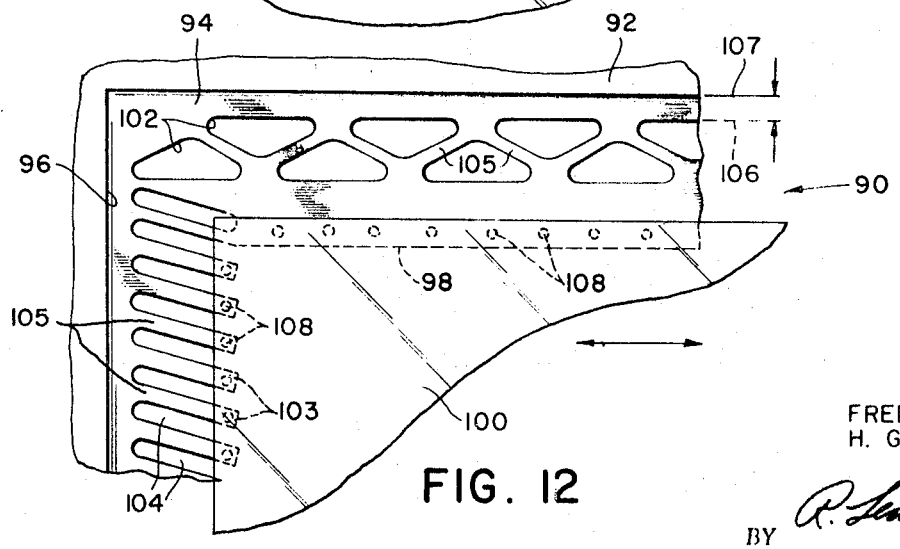
FIG. 12 is a partial, enlarged view of the information bearing card shown in FIG. 9 demonstrating the effects of the differing rates of expansion of the information bearing card and the medium.

The laminar layer 92 has a substantially rectangular aperture 96 whose dimensions are larger than those of a substantially rectangular aperture 98 disposed in the laminar layer 94. The information bearing card 90 includes an information bearing medium 100 of a substantially rectangular configuration whose dimensions are intermediate those of the aperture 96 and the aperture 98. The medium 100 is disposed within the aperture 96 and is secured to the laminar layer 94 by a plurality of areas 108 of adhesive. A plurality of slots 102 are disposed on either side of the medium 100 in a plurality of rows. The slots 102 are disposed to extend along a direction parallel to the longer dimension of the medium 100 and also to the wire direction of the material of which the card 90 is made. In a manner similar to that described above, the plurality of rows of slots 102 will allow the movement of the outer edge of the medium 100, as shown in FIG. 12, to cause the originally parallel sides of the slots 102 to assume a more or less triangular configuration due to the deflection or bending of a plurality of struts 105 formed between the slots 102. Thus if the information bearing medium 100 is subjected to an increase in humidity or temperature, the periphery of the aperture 96 will move from its original position as indicated by the reference line 106 to a second position indicated by the reference line 107 causing deformation of the slots 102 to an approximate shape as shown in FIG. 12. This expansion will tend to dissipate the forces asserted upon the medium 100 in the transverse direction.

Since the difference expansion of the paper of which the laminar layers 92 and 94 are made, takes place along the shorter dimension of the medium 100, an additional means of relieving the stresses may be also provided as shown in FIGS. 9, 10, 11 and 12. In particular, a second set of slots 104 are disposed in the laminar layer 94 along the wire direction of the material of which the laminar layer 94 is made. As seen in FIG. 9, the slots 104 extend from the opening 98 toward the periphery of the aperture 96 so as to form a plurality of tongues 104 therebetween. The medium 100 is bonded to the plurality of tongues 105 by a plurality of areas 103 of adhesive. Such a construction, as shown in FIG. 12, will allows the unperforated body of the medium 100 to expand in the direction transverse to the wire direction, causing deflection of the tongues 105 as though they were cantilever beams.

Figure 13:
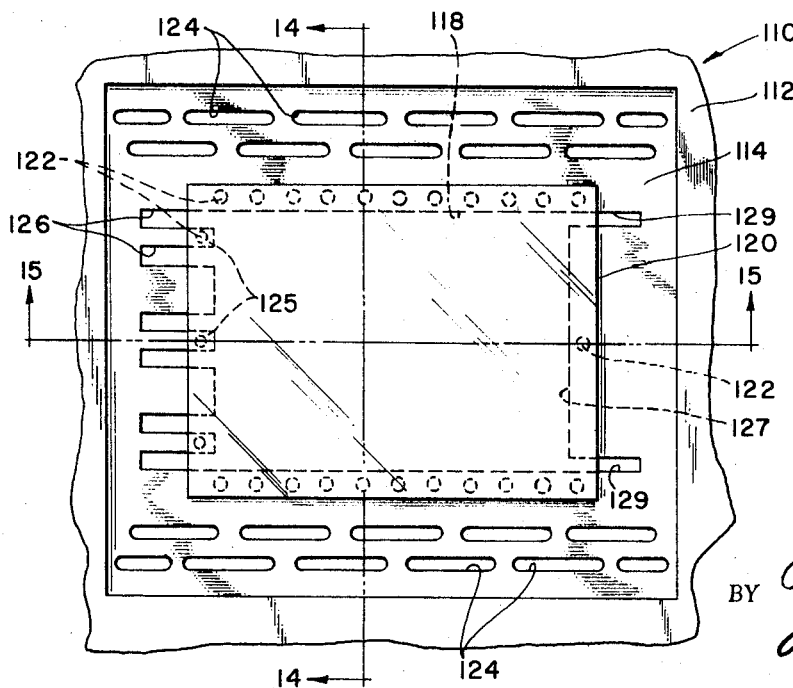
FIG. 13 is an enlarged, partial view of an alternative embodiment of this invention in which apertures are disposed about the information bearing medium.

Referring now to FIGS. 13, 14 and 15, there is shown an information bearing card 110 made up of a first and second laminar layers 112 and 114 bonded together by a suitable adhesive 128. In a manner similar to that described above, the first and second laminar layers 112 and 114 have respectively apertures 116 and 118 disposed therein. As shown in FIG. 13, an information bearing medium 120 is disposed within the aperture 116 and is secured to the laminar layer 114 by a plurality of sealing areas 122 of a suitable adhesive. As explained above, a plurality of slots or openings 124 may be disposed about the information bearing medium 120 so as to extend in a direction parallel to the wire direction of the material of which the laminar layer 114 is made, in order to relieve the stresses placed upon the medium 120. As shown on the left-hand side of FIG. 13, a plurality of slots 126 may be disposed in the laminar layer 114 to extend from the aperture 118 along a direction parallel to the wire direction of the material of which laminar layer 114 is made. The slots 126 form a plurality of narrow tongues or fingers 125 therebetween to which the medium 120 is secured by the sealing areas 122. Alternatively, a single wide tongue 127 can be formed by a pair of slots 129 disposed in the laminar layer 114 and the medium 120 may be secured thereto by a sealing area 122 disposed at the approximate center lines of the medium 120 and the aperture 118.

With regard to the FIGS. 16, 17, 18, and 19, there is shown an information bearing card 130 made up of first and second laminar layers 132 and 134 bonded together by a suitable adhesive 144. The laminar layers 132 and 134, respectively have apertures 136 and 138 disposed therein in a manner similar to that described above. Further, an information bearing medium 140 is disposed within the aperture 136 and is secured to the laminar layer 134 at a plurality of sealing areas 141 by a suitable adhesive. In some instances, it may not be desirable to place elongated holes or to allow uncovered portions of slots to exist in an information bearing card which is to be used in a sorting and tabulating card machine, because these openings might be read as data perforations. One way of overcoming this problem and also to alleviate stresses, would be to make the openings very narrow in comparison with the standard data perforations. In the embodiment of this invention shown in FIGS. 16, 17, 18 and 19, slits or cleavages 142 may be cut by various production techniques without the removal of any material from the laminar layer 134. More specifically, the slits 142 are disposed along the wire direction of the material of which the laminar layer 134 is made, in the area between medium 140 and the inner periphery of the aperture 136. Further, a plurality of slots or cleavages 143 may be disposed along a direction parallel to the wire direction of material of the laminar layer 134 so as to intersect the aperture 138 as shown in FIG. 16. When tension is developed between the medium 140 and laminar layer 134 due to changes in temperature and/or humidity, the inner periphery of the aperture 136 will move, as seen in FIG. 19, from an initial position indicated by the reference line 147 to a second position indicated by the reference line 148 to thereby open slots 142 and to permit the cantilever beam type of deflection by a plurality of tongues or fingers 146 formed by the slits 143. As a result, the stress forces directed transverse to the wire direction may be minimized or alleviated by the opening of the slits 142 and the deflection of the tongues 146.

Figure 20:
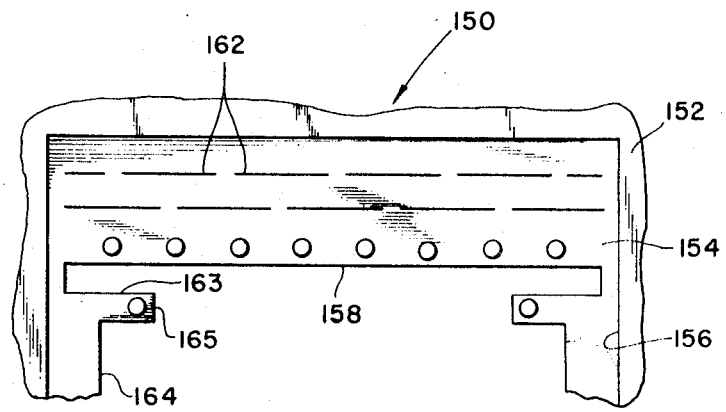
FIG. 20 is a partial, enlarged view of another embodiment of this invention in which slits and slots are disposed about the information bearing medium.
Figure 21:
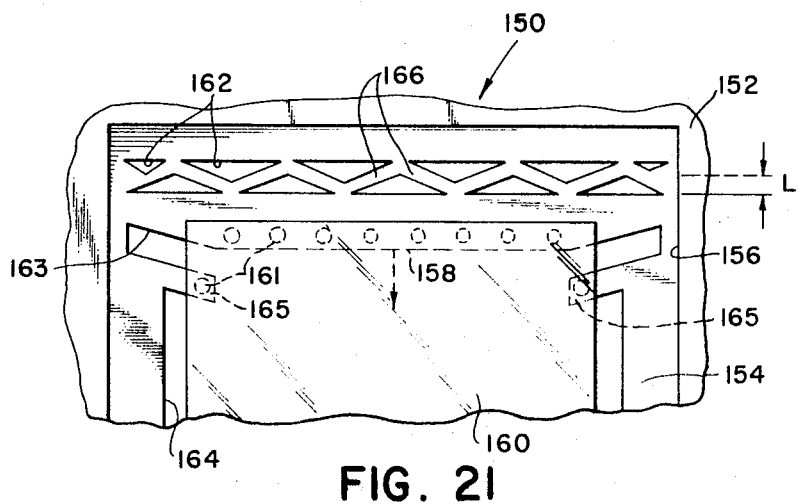
FIG. 21 shows a partial, enlarged view of the information bearing card of FIG. 20 in which the card has been pre-expanded to a predetermined degree before the information bearing medium is mounted thereon.

If slits are used to relieve the stresses developed upon the medium as shown in FIGS. 16, 17, 18, and 19, the ability to absorb the forces in compression may be lost. More specifically, if the material of which the laminar layers are made shrinks, there may be no way of accommodating compressive forces. One possible solution to this problem would be to thoroughly dry the material such as paper before the medium is secured thereto. In an illustrative case, where the medium is made of polyester which has essentially no change with variations in moisture content, the only significant change in the moisture content will be that of the laminar layers which would tend to cause the layers to expand. Such expansion would be readily released or accommodated by the slits shown in FIGS. 16, 17, 18 and 19. However, it may be inconvenient or expensive to provide a substantially dry paper stock in a mass production operation. With reference to FIGS. 20 and 21, there is shown an information bearing card 150 utilizing slits 162 in a manner to absorb compressive as well as tension forces. The information bearing card 150 includes first and second laminar layers 152 and 154 bonded together by a suitable adhesive. In a manner similar to that described above, laminar layers 152 and 154 have first and second apertures 156 and 158 disposed therein. An information bearing medium 160 is disposed within the aperture 156, and is secured at a plurality of sealing areas 161 by a suitable adhesive to the laminar layer 154. The laminar layer 154 has openings 163 and 164 disposed therein to form a plurality of fingers or tongues 165 to which the medium 160 is secured as by the sealing areas 161. After the bonding together of the laminar layers 152 and 154, the peripheral portion of laminar layer 154 about opening 164 is stretched in a direction parallel to the short direction of the medium 160 or transverse to the wire direction of the material of which the laminar layers 154 and 156 are made. More specifically as seen in FIG. 21, the laminar layers 152 and 154 are stretched a distance L so as to permanently deform the material, e.g., the paper and to open the slits 162. After the material of the laminar layers 152 and 164 has been stretched, the medium 160 is disposed in a place and bonded to the laminar layer 154 as described above. Thus, when the laminar layers 152 and 154 have been processed, the material of the laminar layers 152 and 154 are able to expand or contract at right angles to the wire direction and that struts 166 will be formed to provide a means to accommodate the stresses created by changes in the humidity and/or temperature.

The invention has been described in detail with particular reference to preferred embodiments thereof, but it will be understood that variations and modifications can be effected within the spirit and scope of the invention.

We claim:
1. An information bearing card comprising:
 (a) first and second laminar layers having respectively first and second apertures of a preselected configuration, the corresponding dimensions of said first aperture being larger than those of said second aperture, said first laminar layer being united to said second laminar layer so that said first aperture is in registration with said second aperture, said second laminar layer having a plurality of openings disposed about said second aperture; and
 (b) an information bearing medium having preselected dimensions, said dimensions of said information bearing medium being less than the corresponding dimensions of said first aperture and greater than the corresponding dimensions of said second aperture, said information bearing medium disposed in said first aperture and being bonded to said information bearing card.

2. An information bearing card comprising:
(a) first and second laminar layers having respectively first and second openings of preselected configurations and having preselected dimensions, the corresponding dimensions of said first opening being larger than those of said second opening, said first laminar being united to said second laminar so that said first opening is in registration with said second opening,
(b) said information bearing card having a plurality of slits disposed about said second opening; and
(c) an information bearing medium having preselected dimensions, said dimensions of said information bearing medium being less than the corresponding dimensions of said first opening and greater than the corresponding dimensions of said second opening, said information bearing medium disposed in said first opening.

3. An information bearing card as claimed in claim 2 wherein said information bearing card is made of a material having a wire direction, said slits being disposed along a direction substantially parallel to said wire direction.

4. An information bearing card as claimed in claim 2, wherein said plurality of slits have peripheries movable from a first substantially closed position to a second open position.

5. An informtion bearing card comprising:
(a) first and second laminar layers having respectively first and second apertures, said first and second apertures having peripheries of a preselected configuration and of preselected dimensions, said dimensions of said first aperture being larger than the corresponding dimensions of said second aperture, said first laminar layer being united to said second laminar layer so that said first aperture is in registration with said second aperture,
(b) said second laminar layer having perforations therein disposed between said periphery of said second aperture and said periphery of said first aperture, and
(c) an information bearing medium have preselected dimensions, said dimensions of said information bearing medium being less than the corresponding dimensions of said first aperture and being greater than the corresponding dimensions of said second aperture, said information bearing medium being disposed in said first aperture and being secured to said second laminar layer.

6. An information bearing card as claimed in claim 5, wherein said perforations take the form of slits having edge portions movable from a first substantially closed position to a second substantially open position.

7. An information bearing card as claimed in claim 6, wherein said slits are disposed intermediate said first and second positions when said information bearing medium is secured to said second laminar layer to allow said first laminar layer to expand and contract with respect to said information bearing medium.

8. An information bearing card as claimed in claim 5, wherein said information bearing medium is secured to said second laminar layer by a plurality of sealing areas, at least one of said plurality of sealing areas being disposed substantially centrally of said perforations.

References Cited

UNITED STATES PATENTS

| | | | |
|---|---|---|---|
| 2,165,250 | 7/1939 | George | 40—158 |
| 2,512,106 | 6/1950 | Langan | 40—158 |
| 2,739,401 | 3/1956 | Balter | 40—158 |
| 3,177,600 | 4/1965 | Wengel | 40—158 |
| 2,984,921 | 5/1961 | Herzig | 40—158 |

ROBERT W. MICHELL, Primary Examiner

W. J. CONTRERAS, Assistant Examiner